US008661829B2

(12) United States Patent
Bourgois et al.

(10) Patent No.: US 8,661,829 B2

(45) Date of Patent: Mar. 4, 2014

(54) AERODYNAMIC SHROUD FOR THE BACK OF A COMBUSTION CHAMBER OF A TURBOMACHINE

(75) Inventors: Sebastien Alain Christophe Bourgois, Saint Germain les Corbeil (FR); Didier Hippolyte Hernandez, Quiers (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/820,763

(22) PCT Filed: Sep. 13, 2011

(86) PCT No.: PCT/FR2011/052084

§ 371 (c)(1), (2), (4) Date: Mar. 5, 2013

(87) PCT Pub. No.: WO2012/035248

PCT Pub. Date: Mar. 22, 2012

(65) Prior Publication Data

US 2013/0160452 A1 Jun. 27, 2013

(30) Foreign Application Priority Data

Sep. 14, 2010 (FR) ...................................... 10 57319

(51) Int. Cl.
*F02C 1/00* (2006.01)

(52) U.S. Cl.
USPC ............................................... 60/752; 60/804

(58) Field of Classification Search
USPC ............................ 60/752–760, 796–800, 804
See application file for complete search history.

(56) References Cited

U.S. PATENT DOCUMENTS

| | | | | |
|---|---|---|---|---|
| 3,750,397 | A | 8/1973 | Cohen et al. | |
| 5,279,126 | A | 1/1994 | Holladay | |
| 5,331,815 | A | 7/1994 | Reinhold, Jr. et al. | |
| 5,524,430 | A * | 6/1996 | Mazeaud et al. | 60/798 |
| 6,952,927 | B2 * | 10/2005 | Howell et al. | 60/798 |
| 7,222,488 | B2 * | 5/2007 | Farmer et al. | 60/747 |
| 7,637,111 | B2 * | 12/2009 | Pieussergues et al. | 60/798 |
| 7,673,457 | B2 * | 3/2010 | Bessagnet et al. | 60/752 |

(Continued)

FOREIGN PATENT DOCUMENTS

| | | |
|---|---|---|
| DE | 101 59 668 A1 | 6/2003 |
| EP | 0 562 792 A1 | 9/1993 |

(Continued)

OTHER PUBLICATIONS

International Search Report and Written Opinion issued Feb. 24, 2012 in PCT/FR2011/052084.

*Primary Examiner* — Phutthiwat Wongwian

(74) *Attorney, Agent, or Firm* — Oblon, Spivak, McClelland, Maier & Neustadt, L.L.P.

(57) ABSTRACT

An annular shroud (42), having an internal face intended to cover the back end wall (33) of an annular combustion chamber (12) of a turbomachine (14) fitted with a centrifugal compressor, together with an external face opposite said internal face, and where said shroud includes multiple apertures (54) intended to allow fuel injectors (38, 40) supported by said back end wall (33) to pass through, together with multiple bosses (56) which extend as projections on said external face radially towards the interior respectively from the respective radially internal edges (58) of said apertures (54), such that each of said bosses (56) delimits an extension (60) of the corresponding aperture (54) open radially towards the exterior so as to form an air intake scoop.

14 Claims, 5 Drawing Sheets

(56) References Cited

U.S. PATENT DOCUMENTS

| | | | | |
|---|---|---|---|---|
| 7,757,495 | B2 * | 7/2010 | Bessagnet et al. | 60/800 |
| 7,770,398 | B2 * | 8/2010 | De Sousa et al. | 60/752 |
| 7,861,531 | B2 * | 1/2011 | Bunel et al. | 60/752 |
| 8,087,252 | B2 * | 1/2012 | De Sousa et al. | 60/796 |
| 8,141,371 | B1 * | 3/2012 | Habarou et al. | 60/804 |
| 2007/0012048 | A1 | 1/2007 | Buret et al. | |
| 2009/0078797 | A1 | 3/2009 | Hernandez et al. | |
| 2012/0047899 | A1 | 3/2012 | Bourgois et al. | |
| 2012/0055164 | A1 | 3/2012 | Bourgois et al. | |
| 2012/0291442 | A1 | 11/2012 | Commaret et al. | |

FOREIGN PATENT DOCUMENTS

| | | | |
|---|---|---|---|
| EP | 1 746 348 | A2 | 1/2007 |
| FR | 2 910 597 | A1 | 6/2008 |
| GB | 2 391 297 | A | 2/2004 |
| WO | WO 2010/105999 | A1 | 9/2010 |

* cited by examiner

AERODYNAMIC SHROUD FOR THE BACK OF A COMBUSTION CHAMBER OF A TURBOMACHINE

TECHNICAL FIELD

The present invention relates to a shroud intended to cover the back end wall of an annular combustion chamber in a turbomachine, such as an aircraft turbomachine in particular.

The invention also relates to a combustion chamber including a shroud of this type, together with a turbomachine including such a combustion chamber.

The invention relates more particularly to a shroud intended to be fitted to the combustion chamber of a turbomachine including a compressor of the centrifugal type positioned upstream from the combustion chamber.

STATE OF THE PRIOR ART

A turbomachine annular combustion chamber is habitually housed in an annular enclosure downstream from a compressor of the turbomachine, and delimited by two coaxial walls, of essentially rotationally symmetrical cylindrical or tapered shape, where these walls are connected to one another roughly at their upstream ends by a back-of-chamber annular end wall fitted with air and fuel injection devices including means of support of fuel injector heads, together with air inlet apertures.

The coaxial walls of these combustion chambers also generally include air inlet apertures, sometimes called “primary apertures” when they are fitted around an upstream region of the combustion chamber, and “dilution apertures” when they are fitted around a downstream region of this chamber, to allow an additional injection of air in the chamber.

The back-of-chamber annular end wall is generally covered on the upstream side by an annular shroud allowing a portion of the airstream originating from the compressor, which portion is intended to flow downstream in the annular enclosure in which the combustion chamber is housed to be guided by bypassing the latter, in order notably to feed the air inlet apertures formed in the coaxial walls of the chamber, and where another portion of this airstream is intended to penetrate inside the combustion chamber through the air inlet apertures of the air and fuel injection devices fitted in the back end wall, passing through apertures of the shroud also allowing the injector heads to pass through them.

The purpose of the shroud covering the back end wall of a combustion chamber is generally to reduce the load loss to which the airstream bypassing the combustion chamber is subject. To this end, this shroud generally takes the shape of a roughly C-shaped rotationally symmetrical wall the concavity of which faces downstream when seen as a half-section along an axial median plane.

However, in turbomachines including a compressor of the centrifugal type upstream from the combustion chamber, the airstream originating from this compressor enters the abovementioned enclosure, passing through an annular diffuser/guide vane assembly opening out in a radially external area of this enclosure. As a consequence, the airstream feeding the air inlet apertures of the injection devices and the airstream bypassing the combustion chamber along the radially internal wall of this chamber are subject to a substantial diversion radially towards the interior, which is such that it increases the load loss of these airstreams.

And the greater the load loss within the air and fuel injection devices the better the performance of these devices may be. This makes reduced load loss upstream from these devices desirable.

In addition, the applicant has observed that in these centrifugal compressor turbomachines there is an increased risk of separation of the airstream intended to bypass the combustion chamber and flow downstream along the radially internal wall of the combustion chamber, notably in order to feed the air inlet apertures of the chamber’s coaxial walls, in proximity to the shroud and downstream from it in the radially internal region of the enclosure containing the combustion chamber.

And separations of this airstream are not desirable since they are likely to cause operational instabilities in the combustion chamber.

DESCRIPTION OF THE INVENTION

One aim of the invention is notably to provide a simple, economic and efficient solution to these problems, allowing at least some of the abovementioned disadvantages to be avoided.

The invention proposes to this end an annular shroud, having an internal face intended to cover the back end wall of an annular combustion chamber of a turbomachine fitted with a centrifugal compressor, and an outer face opposite the abovementioned internal face, where the shroud includes multiple apertures designed to allow fuel injectors supported by the back end wall of the combustion chamber to pass through it.

According to the invention, the shroud includes multiple bosses which project from said outer face of the shroud, radially towards the interior respectively from the respective radially internal edges of said apertures, such that each of said bosses delimits an extension of the corresponding aperture, where this extension is radially open towards the exterior so as to form an air intake scoop.

Such an air intake scoop allows the air feed through the corresponding aperture of the shroud to be improved, notably by reducing the load loss incurred by the air traversing this aperture.

In addition, the bosses of the shroud enable guidance of the airstream flowing radially towards the interior and then downstream along the shroud to be improved, and in particular enable the risks of separation of this airstream to be reduced.

To this end, the abovementioned bosses advantageously extend as far as a radially internal end of the shroud.

In a preferred embodiment of the invention each of the shroud’s bosses has a radial plane of symmetry including a central axis of said shroud and an axis of injection of the corresponding aperture.

The axis of injection of the aperture is naturally the same as the axis of injection of an injector when the latter is fitted in said aperture.

The shroud according to this first embodiment is particularly advantageous when it is used in a turbomachine in which the airstream originating from the compressor has no gyratory component.

In a second embodiment of the invention the extension of each of the abovementioned apertures has a protrusion which is offset circumferentially relative to an axis of injection of the aperture.

Here again, the axis of injection of the aperture is the same as the axis of injection of an injector fitted in said aperture.

The shroud according to this second embodiment is particularly advantageous when it is used in a turbomachine in which the airstream originating from the compressor has a gyratory component in the direction from the protrusion of the extension of each aperture towards the axis of injection of the corresponding injector. This enables the scoop effect produced by these extensions with regard to the airstream originating from the compressor to be improved.

In addition, in this second embodiment of the invention, the radially internal edge of each aperture can be parallel to the tangential direction, or again inclined relative to this tangential direction.

In this latter case, the inclination of the radially internal edge of the apertures relative to the tangential direction is advantageously such that this edge forms an acute angle with the direction of arrival of the airstream, where this angle is preferably a right angle. This enables the scoop effect produced by the extensions to be maximised.

As a variant, the inclination of the radially internal edge of the apertures relative to the tangential direction can be such that this edge forms an obtuse angle with the direction of arrival of the airstream.

The invention also relates to an annular combustion chamber intended to be installed downstream from a centrifugal compressor in a turbomachine, including two coaxial walls connected to one another upstream by a back-of-chamber annular end wall, together with an annular shroud of the type described above, having an internal face covering the back-of-chamber end wall on the upstream side of the latter.

In a known manner, the shroud advantageously includes two end edges, respectively radially internal and external, which are attached respectively to the coaxial walls of the combustion chamber and/or to ends of the back wall of this combustion chamber.

The invention also relates to a turbomachine including an annular combustion chamber of the type described above, together with a centrifugal compressor installed upstream from the combustion chamber.

When the turbomachine's compressor is configured to deliver an airstream to feed the combustion chamber having no gyratory component the shroud of the combustion chamber is preferably in accordance with the first embodiment described above.

Conversely, when the compressor of the turbomachine is configured to deliver an airstream to feed the combustion chamber having a gyratory component, the shroud of the combustion chamber is preferably in accordance with the second embodiment described above.

BRIEF DESCRIPTION OF THE ILLUSTRATIONS

The invention will be better understood, and other details, advantages and characteristics of it will appear, on reading the following description given as a non-restrictive example, and with reference to the appended illustrations, in which.

Figure 1:
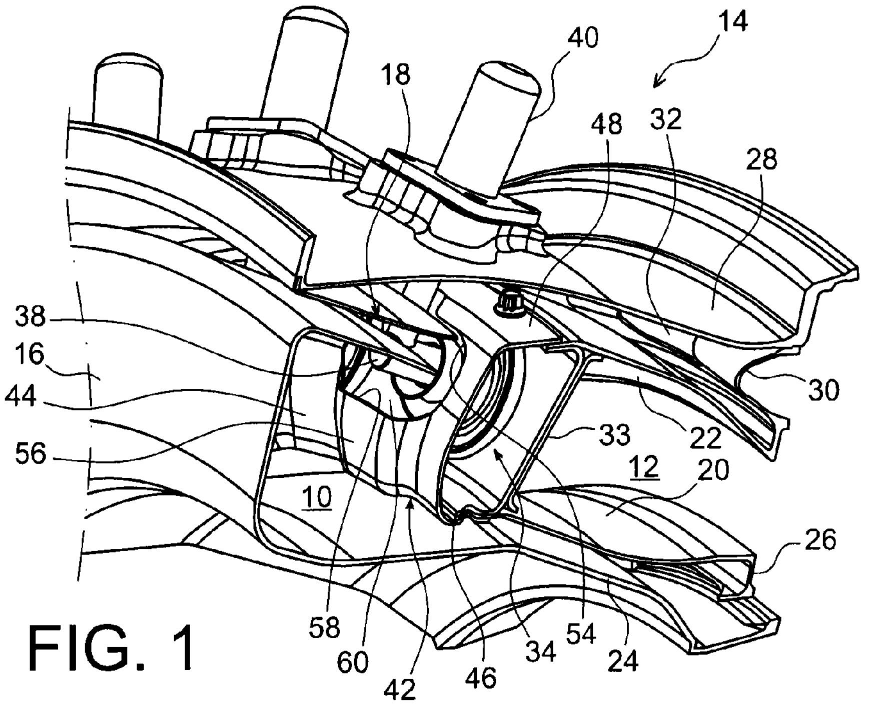
FIG. 1 is a partial schematic perspective view as an axial section of a turbomachine according to a first preferred embodiment of the invention.
Figure 5:
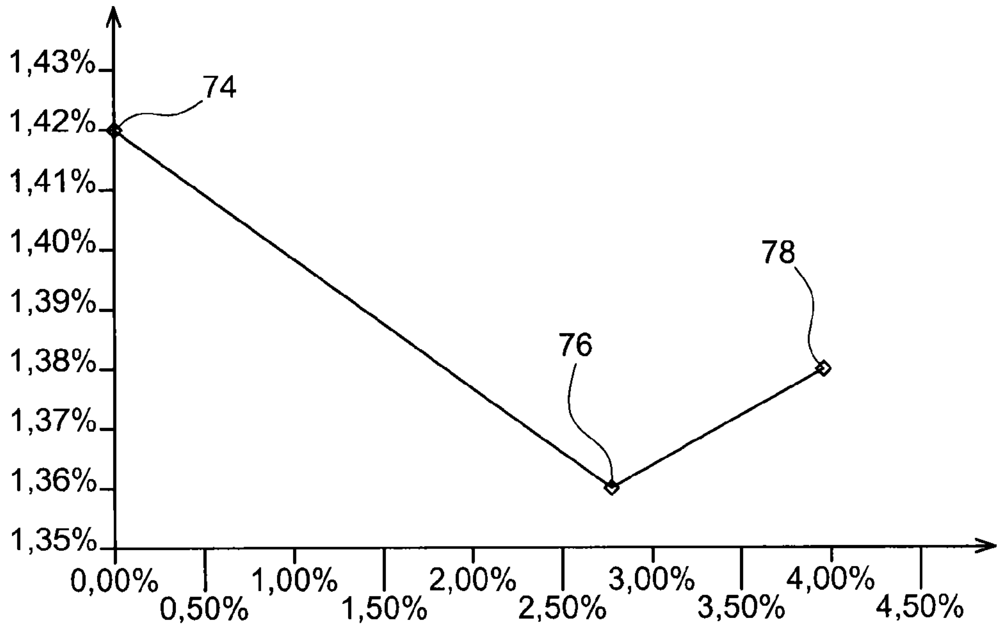
Figure 6:
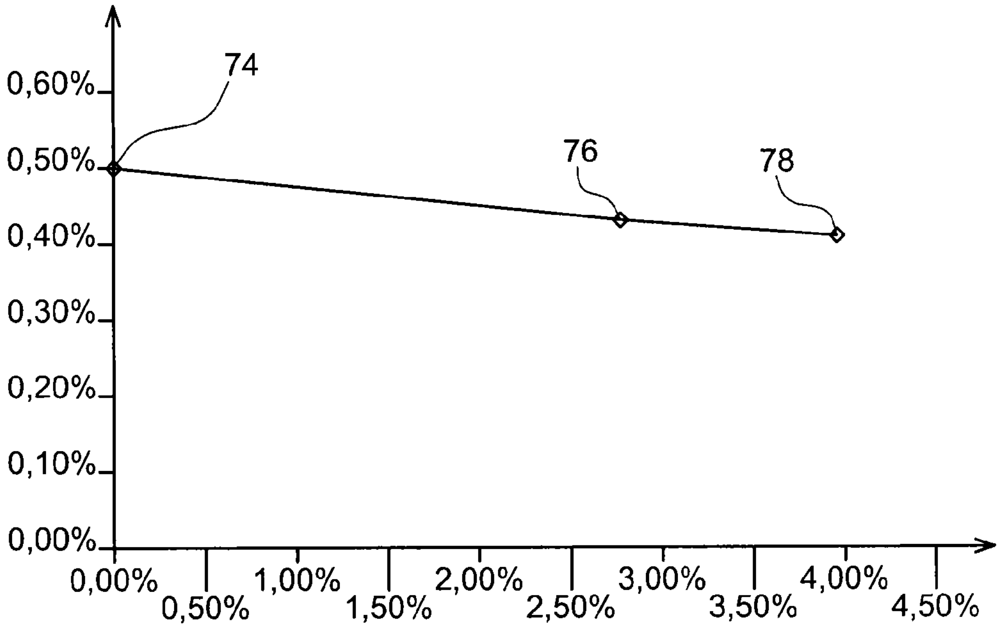
Figure 7:
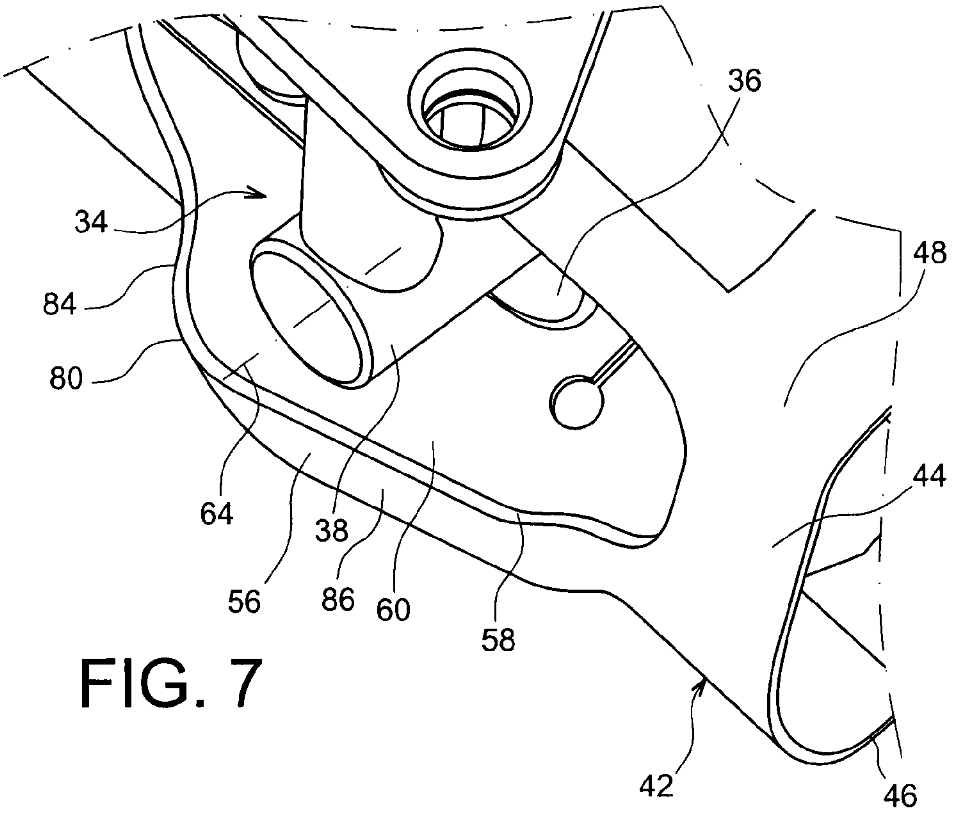
Figure 8:
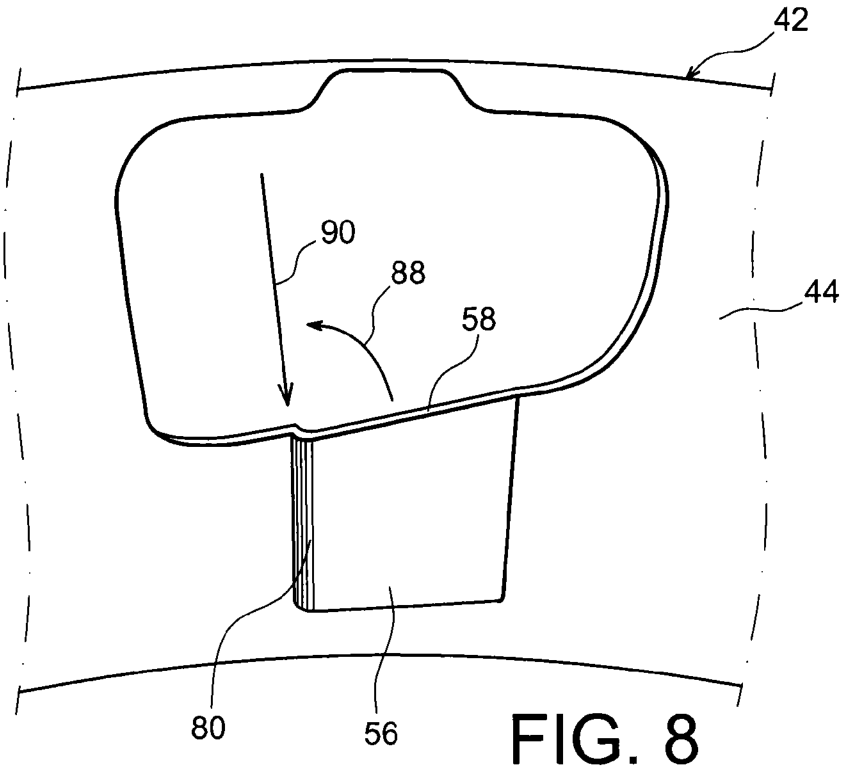
Figure 9:
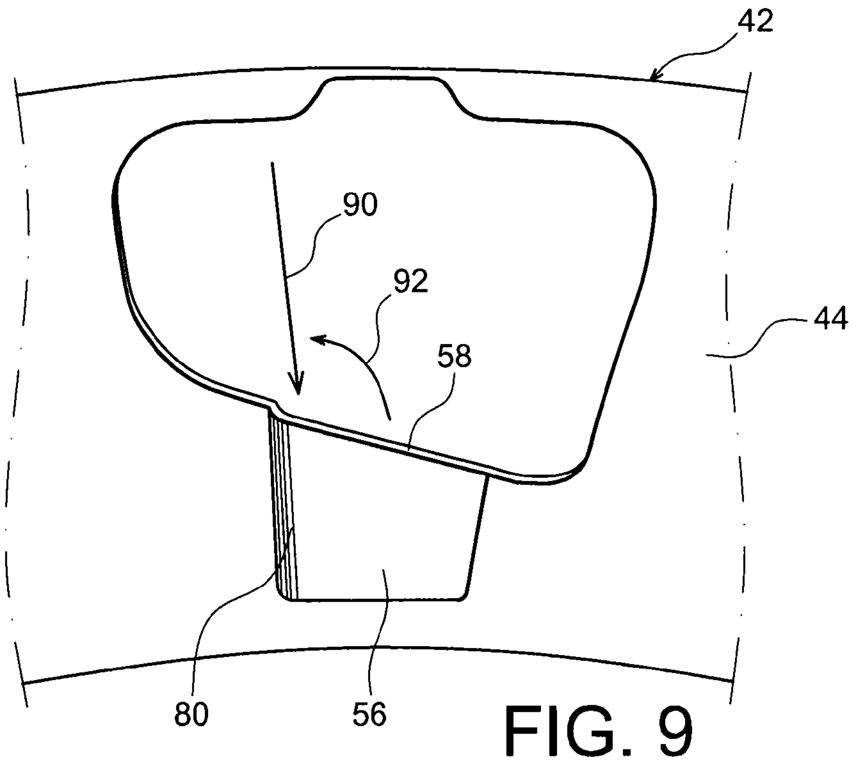

FIG. 5 is a curve representing the load loss of an airstream originating from the outlet of a compressor of the turbomachine of FIG. 1, between this outlet and the outlet of enclosure in which said combustion chamber is housed, as a function of a ratio between the axial depth of the bosses formed in a shroud at the back end wall of said combustion chamber and an average radius of the back end wall of this combustion chamber;

FIG. 6 is a curve representing the load loss of an airstream originating from the outlet of the compressor of the turbomachine of FIG. 1, between this outlet and the inlet of the air and fuel injection devices of said combustion chamber, as a function of a ratio between the axial depth of the bosses formed in the shroud at the back end wall of said combustion chamber and an average radius of the back end wall of this combustion chamber;

FIG. 7 is a partial perspective schematic view of a turbomachine according to a second preferred embodiment of the invention, illustrating a shroud at the back end wall of the combustion chamber of this turbomachine;

FIG. 8 is a partial perspective schematic view of a turbomachine according to a third preferred embodiment of the invention, illustrating a shroud at the back end wall of the combustion chamber of this turbomachine, represented alone;

FIG. 9 is a partial perspective schematic view of a turbomachine according to a fourth preferred embodiment of the invention, illustrating a shroud at the back end wall of the combustion chamber of this turbomachine, represented alone.

In all these figures, identical references can designate identical or comparable elements.

DETAILED ACCOUNT OF PREFERRED EMBODIMENTS

FIGS. 1 to 4 illustrate an annular enclosure 10 in which an annular combustion chamber 12 is housed in a turbomachine 14 in accordance with a first preferred embodiment of the invention.

Figure 3:
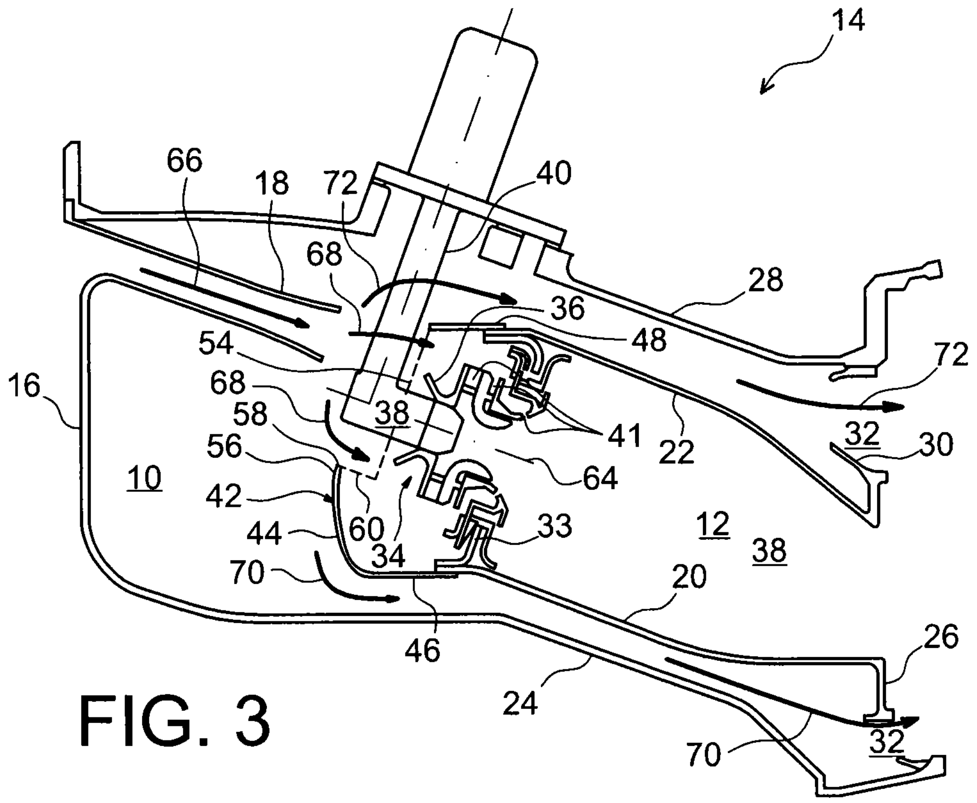
FIG. 3 is a partial schematic view of the turbomachine of FIG. 1, as an axial section in a plane including the axis of a fuel injector.
Figure 4:
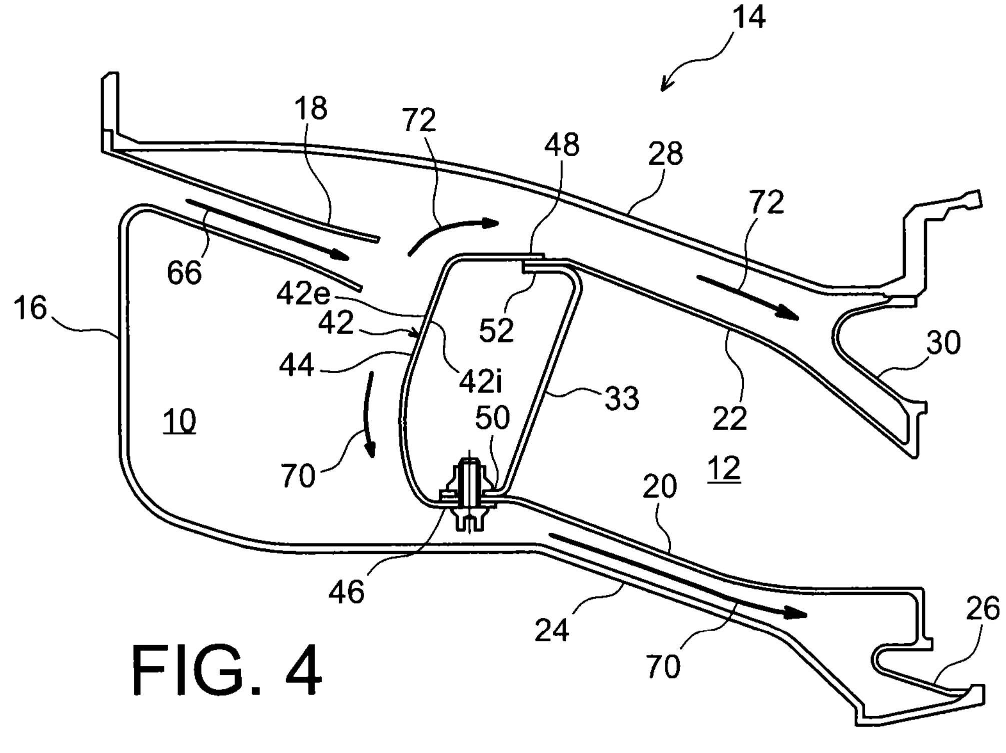
FIG. 4 is a partial schematic view of the turbomachine of FIG. 1, as an axial section in a plane equidistant between two consecutive fuel injectors.

Turbomachine 14 includes a compressor of the centrifugal type upstream from annular enclosure 10, of which only one downstream annular wall 16 can be seen in FIGS. 1, 3 and 4. The compressor is connected at its outlet to a diffuser/guide vane assembly 18 which opens out in a radially external area of annular enclosure 10.

Combustion chamber 12 is delimited by two coaxial walls of essentially tapering shape, respectively internal wall 20 and external wall 22.

Internal wall 20 of the combustion chamber is connected to an internal annular wall 24 of enclosure 10 by an internal annular shell 26, while external wall 22 of the combustion chamber is connected to an external annular wall 28 of enclosure 10 by an external annular shell 30. Abovementioned annular shells 26 and 30 have apertures 32 for the passage of air (FIG. 3).

Internal wall 20 and external wall 22 of the combustion chamber are also connected to one another at their upstream end by a back-of-chamber annular end wall 33 (FIGS. 1 and 2) extending roughly in the radial direction, and having multiple air and fuel injection devices 34, each including means 36 for supporting head 38 of a fuel injector 40, together with air inlet apertures 41 (FIG. 3), in a known manner.

Annular back-of-chamber end wall 33 is covered, on the upstream side, by an annual shroud 42 having essentially a C-shaped axial half-section the concavity of which faces downstream (FIGS. 1 to 4).

Shroud 42 thus has an internal face 42*i* covering back-of-chamber annular end wall 33 and an external face 42*e* opposite internal face 42*i* (FIG. 4).

In addition, shroud 42 includes a median annular portion 44 extending roughly parallel to back-of-chamber annular end wall 33, and two end angular portions, respectively internal portion 46 and external portion 48, which are curved at their downstream ends, and which are intended to attach shroud 42 for example by bolting (FIGS. 1 and 2) on to internal wall 20 and external wall 22 of the combustion chamber, and on to ends 50 and 52 of back-of-chamber annular end wall 33, which ends are curved towards the upstream side (FIG. 4).

Median annular portion 44 of shroud 42 has multiple apertures 54 designed to allow heads 38 of fuel injectors 40 to pass through, and to allow air 68 intended to feed air inlet apertures 41 of injection devices 34 to pass through (FIG. 3), as will be shown more clearly below.

Furthermore, shroud 42 includes multiple bosses 56 formed essentially in its median annular portion 44.

More accurately, each of bosses 56 extends radially towards the interior from a radially internal edge 58 of a corresponding aperture 54 as far as internal end annular portion 46 of shroud 42.

Figure 2:
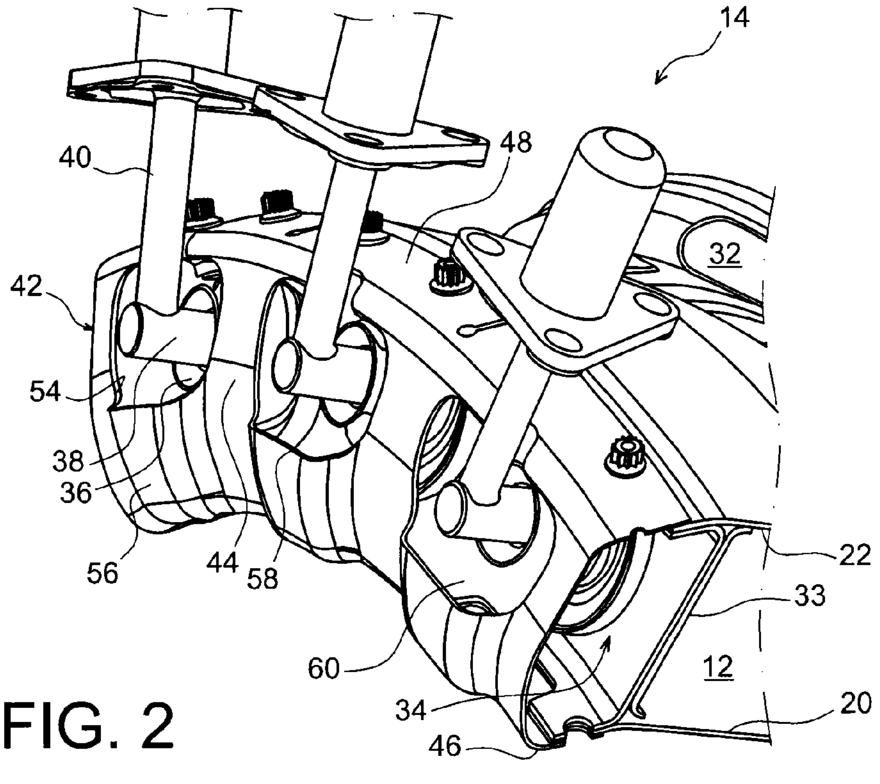
FIG. 2 is a partial perspective schematic view as an axial section of a combustion chamber of the turbomachine of FIG. 1.

In this manner, each boss 56 delimits an extension upstream 60 of corresponding aperture 54, which 60 extension is open radially towards the exterior (FIGS. 2 and 3). In addition, each boss 56 thus forms an air intake scoop, which is such that it improves the air feed of injection devices 34.

In the first embodiment described in FIGS. 1 to 4, each of bosses 56 has a radial plane of symmetry including a central axis of shroud 42, which cannot be seen in the figures, together with an axis of injection 64 of injector 38 of corresponding injection device 34 (FIG. 3). The plane of FIG. 3 is thus a plane of symmetry for boss 56 which can be seen in this FIG. 3. Each boss 56 is consequently centred relative to corresponding injection device 34.

In operation, the compressor delivers an airstream 66 (FIGS. 3 and 4) which is divided in annular enclosure 10 into a central stream 68 feeding injection devices 34 via apertures 54 of shroud 42, and into two bypass streams, respectively internal stream 70 and external stream 72, which follow respectively internal wall 20 and external wall 22 of combustion chamber 12 around the latter, and a portion of which feeds, if applicable, air inlet apertures formed in these walls 20 and 22 (not visible in the figures), and the remainder of which exits from annular enclosure 10 through air passage apertures 32 of internal shell 26 and external shell 30.

In the first embodiment described in FIGS. 1 to 4, airstream 66 originating from the compressor has appreciably no gyratory component, such that the conformation of bosses 56 described above is particularly advantageous.

Bosses 56 generally enable the risks of the separation of airstream 70 bypassing combustion chamber 12 radially towards the interior to be reduced, and therefore enable the risks of operational instabilities of combustion chamber 12 to be reduced.

The reduction of the risks of separation of airstream 70 leads to a reduction of the load loss incurred by this airstream between the outlet of diffuser/guide vane assembly 18 and air passage apertures 32 positioned at the downstream end of annular enclosure 10, as illustrated by the curve of FIG. 5.

This curve, which is obtained by digital simulation, represents the load loss of airstream 70 originating from the outlet of the compressor of turbomachine 14, between this outlet and radially internal air passage apertures 32 positioned at the downstream end of enclosure 10, in accordance with a dimensionless ratio between the axial depth of bosses 56 and an average radius of back 33 of combustion chamber 12.

More accurately, the curve is based on a first computation (point 74) on the basis of an annular shroud of a known type, having no bosses, fitted to a combustion chamber the back of which has an average radius of 252.75 mm, for which the computed load loss is 1.42%, a second computation (point 76) on the basis of a shroud 42 of the type represented in FIGS. 1 to 4 and having bosses of an axial depth of 7 mm, for which the computed load loss is reduced to 1.36%, and a third computation (point 78) on the basis of a shroud similar to the previous one, but the bosses of which have a depth of 10 mm, and leading to a load loss of 1.38%, where these three computations have been made for identical operating conditions of turbomachine 14.

Furthermore, by performing the scoop function, bosses 56 allow the load loss incurred by airstream 68 originating from the outlet of the compressor of turbomachine 14 upstream from air inlet apertures 41 of air and fuel injection devices 34 to be reduced, as illustrated by the curve of FIG. 6.

This curve represents the load loss, obtained by digital simulation on the basis of the three computations described above, of airstream 68 originating from the outlet of the compressor of turbomachine 14, between this outlet and air inlet apertures 41 of air and fuel injection devices 34, as a function of the ratio between the axial depth of bosses 56 and the average radius of back 33 of combustion chamber 12.

This load loss is respectively 0.50%, 0.43% and 0.41% for the abovementioned three computations.

The load loss of airstream 68 feeding fuel injection devices 34 thus seems to decrease in roughly linear fashion with the abovementioned dimensionless ratio (FIG. 6), whereas the load loss of airstream 70 bypassing the combustion chamber radially towards the interior (FIG. 5) is reduced with the bosses of moderate depth, but seems to be penalised when the abovementioned dimensionless ratio exceeds 2.8%, which may be explained by the fact that the large axial depth of bosses 56 then leads to separations of this airstream 70.

FIG. 7 illustrates a second preferred embodiment of the invention, in which airstream 66 originating from the compressor has a gyratory component.

In this second embodiment, bosses 56 of shroud 42 are conformed such that each of extensions 60 of apertures 54, formed by these bosses 56, has a protrusion 80 offset circumferentially relative to central injection axis 64 of injector 38 of corresponding air and fuel injection device 34, in a direction such that airstream 68 feeding these devices encounters said protrusion 80 before encountering said injection axis 64. Each boss 56 includes, either side of its protrusion 80, a curved portion 84 of relatively small extent, and a roughly flat portion 86 of relatively large extent, positioned such that airstream 68 firstly encounters portion of small extent 84 before encountering portion of large extent 86.

Furthermore, radially internal edge 58 of each aperture 54 is parallel to the tangential direction (FIG. 7).

As a variant, this radially internal edge 58 of each aperture 54 can be inclined relative to the tangential direction, as represented in FIGS. 8 and 9.

In this case, the inclination of radially internal edge 58 of apertures 54 relative to the tangential direction is advantageously such that this edge 58 forms an acute angle 88 with direction of arrival 90 of airstream 68. The inclination of radially internal edge 58 is preferably such that edge 58 extends roughly perpendicular to direction 90 of arrival of airstream 68, as illustrated in FIG. 8. This enables the scoop effect produced by extensions 60 to be maximised.

As a variant, the inclination of radially internal edge 58 of apertures 54 relative to the tangential direction can be such that this edge 58 forms an obtuse angle 92 with direction of arrival 90 of airstream 68.

The invention claimed is:

1. An annular shroud, comprising:

an internal face to cover a back end wall of an annular combustion chamber of a turbomachine fitted with a centrifugal compressor;

an external face opposite said internal face;

multiple apertures to allow fuel injectors supported by said back end wall of the combustion chamber to pass through; and multiple bosses which extend as projections on said external face of the annular shroud, radially towards the interior of the annular shroud respectively from respective radially internal edges of said apertures, such that each of said bosses delimits an extension of the corresponding aperture which is open radially towards the exterior of the annular shroud so as to form an air intake scoop.

2. The annular shroud according to claim 1, wherein said bosses extend as far as a radially internal end of said annular shroud.

3. The annular shroud according to claim 1, wherein each of said bosses has a radial plane of symmetry including a central axis of said annular shroud and an axis of injection of the corresponding aperture.

4. The annual shroud according to claim 1, wherein said extension of each of said apertures has a protrusion offset circumferentially relative to an axis of injection of the aperture.

5. An annular combustion chamber to be installed downstream from a centrifugal compressor in a turbomachine, comprising:

two coaxial walls connected to one another upstream by a back-of-chamber annular end wall; and the annular shroud according to claim 1, wherein the internal face of said shroud covers said back-of-chamber end wall on an upstream side of the back-of-chamber end wall.

6. An annular combustion chamber to be installed downstream from a centrifugal compressor in a turbomachine, comprising:

two coaxial walls connected to one another upstream by a back-of-chamber annular end wall; and the annular shroud according to claim 3, wherein the internal face of said shroud covers said back-of-chamber end wall on an upstream side of the back-of-chamber end wall.

7. An annular combustion chamber to be installed downstream from a centrifugal compressor in a turbomachine, comprising:

two coaxial walls connected to one another upstream by a back-of-chamber annular end wall; and the annular shroud according to claim 4, wherein the internal face of said shroud covers said back-of-chamber end wall on an upstream side of the back-of-chamber end wall.

8. A turbomachine, comprising:

the annular combustion chamber according to claim 5; and a centrifugal compressor installed upstream from said combustion chamber.

9. A turbomachine, comprising:

an annular combustion chamber according to claim 6; and a centrifugal compressor installed upstream from said combustion chamber and configured to deliver an airstream feeding said combustion chamber which has no gyratory component.

10. A turbomachine, comprising:

an annular combustion chamber according to claim 7; and a centrifugal compressor installed upstream from said combustion chamber and configured to deliver an airstream feeding said combustion chamber which has a gyratory component.

11. The annular shroud according to claim 1, wherein said annular shroud includes a median annular portion extending substantially parallel to said back end wall of the combustion chamber, an internal end portion, and an external end portion, and downstream ends of the internal and external end portions are curved.

12. The annular shroud according to claim 1, wherein said annular shroud presents an essentially C-shaped axial half section with a concavity facing downstream so as to provide a space between said internal face of the annular shroud and said back end wall of the combustion chamber.

13. The annular shroud according to claim 1, wherein the radially internal edge of said aperture is parallel to a tangential direction.

14. The annular shroud according to claim 1, wherein the radially internal edge of said aperture is inclined relative to a tangential direction.

* * * * *